United States Patent [19]

Plotnikov et al.

[11] 3,965,759

[45] June 29, 1976

[54] SAFETY DEVICE FOR THE DRIVE OF A CLOSING MEMBER

[76] Inventors: Andrei Dmitrievich Plotnikov, ulitsa Zhukovskogo, 38, kv. 18, Leningrad; Viktor Andreevich Soloviev, ulitsa Volkhovskaya, 9, Mga, Leningradskoi oblasti; Tigran Ovanesovich Ter-Mateosiants, Bolshaya Porokhovskaya, 44, korpus 3, kv. 97; Oleg Nikolaevich Shpakov, ulitsa Prazhskaya, 33, kv. 103, both of Leningrad, all of U.S.S.R.

[22] Filed: Oct. 15, 1974

[21] Appl. No.: 515,039

Related U.S. Application Data

[63] Continuation of Ser. No. 298,632, Oct. 18, 1972, abandoned.

[52] U.S. Cl. ........................................ 74/89.14; 74/64
[51] Int. Cl.² ................................................ F16H 27/02
[58] Field of Search ................ 74/64, 89.14, 89.15, 74/424.8 A

[56] References Cited
UNITED STATES PATENTS

| | | |
|---|---|---|
| 1,858,696 | 5/1932 | Weiss .................................. 74/64 |
| 2,005,974 | 6/1935 | Hutchinson, Jr. ...................... 74/64 |
| 2,346,728 | 4/1944 | Carlson ........................... 74/424.8 A |
| 2,598,709 | 6/1952 | Morris ............................... 74/89.14 |
| 3,736,802 | 6/1973 | Kibler ............................... 74/89.15 |

*Primary Examiner*—Samuel Scott
*Assistant Examiner*—Wesley S. Ratliff, Jr.
*Attorney, Agent, or Firm*—Haseltine, Lake & Waters

[57] ABSTRACT

The present invention relates to drives for closing members applicable in various branches of industry, particularly to pipeline closing fittings and clamping fixtures of machine tools, and more specifically, to safety devices for the drives of closing members.

The invention is principally characterized by that in a safety device for the drive of a closing member, comprising a drive switch and a mechanical overload sensor capable of interacting with the drive switch to turn out the drive at an overload thereof, the mechanical overload sensor is made as a fly-wheel rotated from the closing member drive and is capable of movement.

The present safety device provides a reliable protection for the drive of the closing member both from static and dynamic overloads.

2 Claims, 1 Drawing Figure

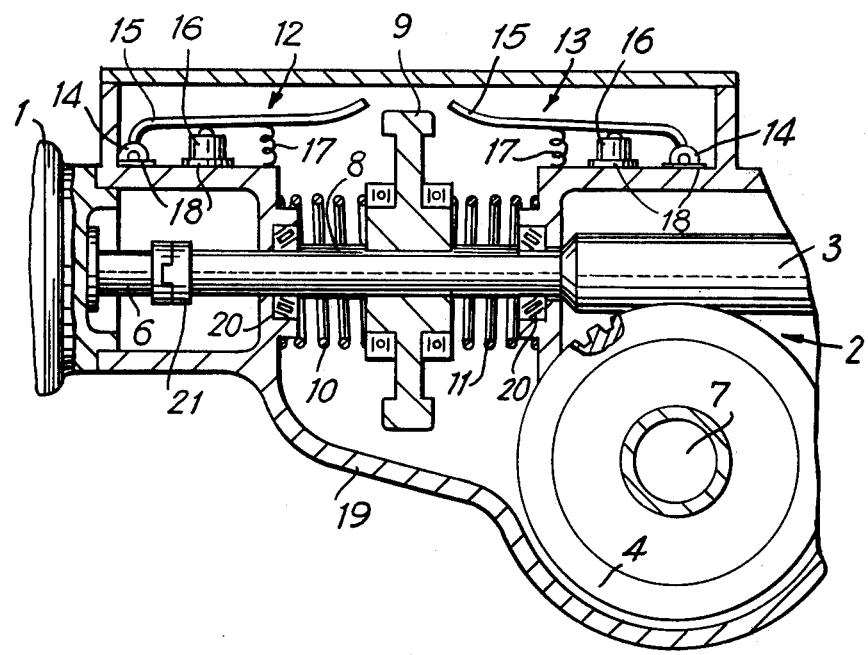

SAFETY DEVICE FOR THE DRIVE OF A CLOSING MEMBER

The present application is a continuation application of Ser. No. 298,632; filed Oct. 18, 1972.

The present invention relates to drives of closing members applicable in various branches of industry, particularly, to pipeline closing fittings and clamping fixtures of machine tools and more specifically, to a safety device for the drive of a closing member.

There is known an electric drive available from the "Rotork" (England) for controlling pipeline closing fittings, which electric drive incorporates an electric motor with a gearing-down worm reducer whose worm is mounted on a high-speed shaft with a possibility of axial movement. Besides, the worm is provided with two compression springs on its either side whose forces upon the worm prevent the latter from axial displacement in case of no overload on the drive. As an overload safety device in this known electric drive use is made of switches which turn out the electric drive when the closing members of corresponding closing fittings are in the extreme positions, i.e., when the drive is overloaded and the worm is moved in a corresponding direction and, while overcoming the force of a corresponding spring, compresses the latter.

Therefore, said springs located on both sides of the worm, the compression ratio of the springs depending on the overload level on the drive, function as overload sensors. The spring compression ratio is an output value of these sensors which may be controlled for actuating the safety device at a certain force capable of displacing the worm along its axis for turning in a corresponding switch of the drive.

The safety device of the closing member which is accomplished in the abovesaid known electric drive, wherein the functions of overload sensors are performed by power elements, i.e. by springs, capable of taking all the axial load from the reducer worm responds only to torque value produced by the drive but not to the rate of increase of the drive torque.

Furthermore, it is impossible to provide a required accuracy in the adjustment of the safety device and a required sensitivity thereof to drive overloads.

Besides, with the same adjustment of the safety device, the dynamic overloads on mechanisms of the closing members, which feature a low yieldability, considerably exceed the dynamic overloads on mechanisms of the closing members having a high yieldability, and the known safety device, since it does not respond to the rate of torque changes is unable to distinguish between dynamic forces and hence it is unable to prevent troubles in the mechanisms of the closing members resulting from large dynamic loads.

The known safety device of the above electric drive is not free of troubles in the drive mechanism of the closing member, if, when started, the electric motor rotates in the direction opposite to the action of the closing member according to the direction predetermined by the control device. Such a discrepancy in the direction of the electric motor rotation and the control device signal may often occur at trial startings of the closing member drives after repairs due to misconnections of the electric motors to the mains voltage phases.

For a better understanding of the operation of the electric drive, when its electric motor is misconnected to the voltage phases, the following description is given by way of illustration.

Let us assume that a signal is delivered for the closing member to shut off. As a result, if the control circuit of the electric motor is designed properly and the electric motor is properly connected to the voltage phases, the electric motor rotates in the direction corresponding to the shutting off of the closing member. When the latter reaches the extreme position it causes to operate the drive switch located on the side towards which the reducer worm moves to compress the spring due to an overload on the drive while the closing member shuts off. Thus, the safety device operates in the right way and prevents the mechanism of the closing member from overload troubles.

But if, for some reasons, the correspondence between the direction of rotation of the electric motor and the signal for controlling the direction of rotation of the closing member is disturbed (it might occur in case of a phase misconnection of the electric motor or in case of a wrong assembly of the electric motor control circuit) there occurs a dangerous situation at which the safety device is inoperative and as a consequence the mechanism of the closing member might be damaged.

Let us assume, that a signal is sent for the closing member to open. Since, as it has been mentioned above, the direction rotation of the electric motor does not correspond to the signal governing the direction of rotation of the closing member, the electric motor rotates in the opposite direction tending to open the closing member that has already been opened, i.e., it acts against the stop and hence gets overloaded.

But since the control circuit of the electric motor at this signal is connected to the drive switch located on the other side of the worm where the latter, in this case, does not compress the spring, as the axial load acts in the opposite direction, this switch will not operate and the electric motor will not be turned out inspite of the drive overload, and finally, this overload will bring about a damage to the closing member mechanism.

Probably, this safety device of the known electric drive does not also operate for turning out at a start in such cases where for overcoming the forces of inertia and the static frictional forces, the electric motor develops the torque exceeding that to which the safety device has been adjusted.

It is a general object of the present invention to provide a safety device for the drive of a closing member that would ensure a reliable protection of the drive through switching it out in case of any kind of overloads including an overload due to the forces of inertia, and that would be featured by higher sensitivity and faster response, and be simple in construction.

It is a specific object of the present invention to provide a safety device for the drive of a closing member, wherein higher-reliability protection of the drive against overloads is attained due to such an improvement in the overload sensor that would make it capable of responding not only to the torque value but to the rate of torque change as well.

Said objects are accomplished due to the fact that in a safety device for the drive of a closing member, comprising a drive switch and a mechanical overload sensor adapted to interact with the drive switch for turning out the drive in case of an overload of the latter, according to the invention, the mechanical overload sensor is made as a flywheel imparted rotation from the drive of the closing member and mounted with a possibility of axial movement.

It is expedient that the flywheel of the safety device for the drive of a closing member having a gearing-down reducer be mounted on a quick-pitch or non-braking threaded length of a high-speed shaft of said reducer and be axially spring-loaded so as to cause the flywheel to return to the initial position in case the drive is free from overload.

In addition to the construction simplicity, the present safety device for the drive of a closing member provides a protection of the drive from all kinds of overload and is distinguished for high response and fast operation.

The proposed safety device may be broadly used for drives of various pipeline closing fittings (gates, globe valves, ball cocks, swing locks, hermetic gate valves), clamping fixtures of machine tools and other mechanisms adapted to operate against the stop.

The following detailed description of a specific embodiment of the safety device for a closing member according to the present invention is given with reference to an accompanying drawing, which shows a longitudinal-section view of the electric drive of the closing member provided with a safety device, according to the invention.

The electric drive of a closing member comprises an electric motor 1 (FIGURE illustrates only a part of the electric motor adjacent to the gearing-down reducer), a gearing-down worm reducer 2 with a worm 3 and a worm wheel 4.

A high-speed shaft 5 of the gearing-down reducer 2 is connected to a shaft 6 of the electric motor 1. The worm wheel 4 is fastened on a shaft 7 of the closing member. Mounted on a quick-pitch or non-braking thread 8 of the high-speed shaft of the reducer is a flywheel 9 which is loaded on both sides with respective springs 10 and 11. The drive switch comprises two break contacts 12 and 13 each having a movable contact element 15 mounted on a pivot 14, a fixed contact element 16, a return spring 17 of the movable contact element and insulation gaskets 18.

Each of the break contacts is connected to a coil of a corresponding magnetic contactor of the electric motor. The electric drive circuits are made according to a conventional reversible motor control circuit, similar to that used, say, in the prototype, and therefore are not shown in the FIGURE. Besides, getting the drawing rid of any conventional electrical elements bearing no novel information made it possible to more clearly represent the essential and decisive elements illustrating the spirit and scope of the invention.

All the members of the given electric drive are housed in a body 19.

As it is apparent from the above description and the accompanying drawing, the device proposed herein is based on the construction of an overload sensor that is conceptionally novel in comparison with that of the known safety device for the Rotork drive.

In the known Rotork drive the function of an overload sensor is performed by power springs capable of taking up the axial force of the high-speed shaft of the reducer both under normal loads and in case of overloads of the drive. These springs should be designed for considerable compressive stresses in order not to allow an axial displacement of the high-speed shaft of the reducer in case of zero overload of the drive.

It is obvious that the sensor accomplished in such a manner is unable to provide high sensitivity and accuracy of alignment for the safety device to protect the drive from overloads.

Besides, such a safety device is capable to respond only to the drive torque but not to the rate of the torque increase and thus, it does not practically respond to dynamic overloads arising under the action of inertia forces which result from changes of the drive torque which, in turn lead to changes of the drive rotation speed.

Besides, in order to provide operability of the safety device in the above-described known drive, the high-speed shaft of the reducer carrying a worm is so mounted that a considerable axial displacement thereof may occur. This, therefore, inescapably result in an impaired reliability of the drive itself, as well as in a reduced service life thereof.

Alongside with this, the overload sensor in the proposed safety device for the drive of a closing member made as a flywheel, is essentially an inertia sensor as to its operating principle. In the specific embodiment of the proposed device the flywheel 9 is set on the non-self-braking thread 8 of the high-speed shaft 5 of the reducer 2 and is loaded on both sides by the respective springs 10 and 11. When the drive operates normally, i.e., its torque remains unaffected, the flywheel rotates along with the reducer high-speed shaft and is not axially displaced and therefore exerts no action upon the springs 10 and 11.

Besides, the springs 10 and 11 are designed for a rather low compressive force which is high enough only for the flywheel to return to the middle position after the cessation of an overload. Only in case of an intolerable change in the drive torque value the flywheel 9 is moved to the right or to the left due to the accumulated kinetic energy, depending on what a direction the closing member drive has operated in.

Naturally, the proposed safety device with such an overload sensor exhibits a high sensitivity both to overloads and to the rate of overload increase, and thus makes it possible to provide a precise adjustment of the safety device to a predetermined overload value.

Moreover, with the proposed construction of the safety device the high-speed shaft 5 of the reducer with the worm 3 is reliably fixed in bearings 20 to be rotated therein which prevent this shaft from axial displacements. Thus, there are apparently created conditions for a more reliable operation of the drive which provide a prolonged service life thereof.

The above-described safety device operates as follows:

With the electric motor 1 switched on, the shaft 6 and the high-speed shaft 5 of the gearing-down reducer connected thereto through the coupling 21 start rotating at an accelerated speed. When the motor is accelerated until gaining its normal speed, the flywheel 9 mounted on the non-braking thread 8 of the high-speed shaft 5 of the gearing-down reducer 2, due to its steadying effect, rotates at a speed considerably lower than that of the high-speed shaft of the reducer 2. As a result, the flywheel is axially displaced along the thread in the direction opposite to the contact of the drive switch provided in the magnetic contact circuit, said contact being in the ON position in response to the preceding signal causing the drive to operate. For example, with the drive started to operate the high-speed shaft 5 of the reducer rotates clockwise as viewed from the electric motor 1. In the circuit of the contactor that has energized the electric motor, provision is made for a break contact 13 of the drive switch. Thus, the flywheel 9, is displaced while overcoming the tension of the spring 10, to the left, towards the break contact 12 of the drive switch; the contact 12 being incorporated in the circuit of the other contactor which in this case is deenergized, instead in the circuit of the energized contactor that at this moment supplies voltage to the electric motor 1. Therefore, should the contact 12 break, this will not result in deenergizing the electric motor 1. Thus, the present safety device is interlocked to prevent the closing member drive from disconnection at the moment of its starting.

The known above-described safety device is not provided with such an interlock against a flase deenergizing of the drive when started. This is also a substantial disadvantage of the known safety devices.

If for this or that reason, for example, in case of misconnected electric motor phases, the direction of the motor running does not correspond to the signal produced for the drive to start, the flywheel is moved axially along the thread in the direction of the switch contact provided in the magnetic contactor circuit set to the OFF position by the provous signal that has caused the drive to operate. In the herein-considered embodiment of the invention, when at the drive start the high-speed shaft 5 rotates clockwise as viewed from the electric motor 1, the circuit of the contactor that has energized the electric motor includes the break contact 12 of the drive switch towards, which the flywheel 9 moves while overcoming the tension of the spring 10.

Due to an interaction of the flywheel 9 with said contactor 12 of the drive switch, the electric motor 1 is switched out and the drive stops; this prevents the drive from a damage. As it has been shown above, this is also a considerable advantage of the present safety device. We have considered the operation of the proposed safety device at the moment of its start when the speed of the reducer high-speed shaft is greater than that of the flywheel.

After the period of the drive start, when the speeds of the high-speed shaft 5 of the reducer 2 and the flywheel 9 become equal, the latter is returned to the intial position under the action of either of the springs 10 and 11. Now let us consider the operation of the present invention in case of an overload. In this case the rotation speed of the electric motor and of the high-speed shaft 5 of the reducer 2 connected thereto becomes lower and under the action of inertia forces the flywheel 9 keeps rotating at the same speed. It moves axially along the thread of the high-speed shaft 5 of the reducer 2 in the direction of the switch contact provided in the circuit of the magnetic contactor which is being operative to energize the drive electric motor.

While interacting with said switch contact the flywheel causes this contact to break and to deenergize the electric motor with the result that the drive stops.

Let us consider that when the drive is turned in, the high-speed shaft 5 of the gearing-down reducer 2 rotates clockwise as viewed from the electric motor. When an overload occurs, the speed of the electric motor and the associated high-speed shaft 5 of the reducer 2 decreases. As a result, the flywheel keeps rotating at the same speed due to inertia said speed being at this moment greater than the speed of the high-speed shaft 5 of the gearing-down reducer 2. Owing to this, the flywheel axially moves towards the contact 13 of the drive switch that supplies voltage to the coil of the thus-energized magnetic contactor which has switched on the electric motor 1.

While interacting with the contact 13 of the drive switch, the flywheel causes the latter to turn in and open the coil circuit of the respective magnetic contactor, with the result that the latter gets deenergized to switch out the electric motor 1. As a result, the drive stops.

When starting the electric motor in the opposite direction, in case the high-speed shaft 5 of the reducer 2 rotates counter-clockwise as viewed from the electric motor 1, the safety device operates in a way similar to that hereinbefore described.

It should be mentioned that the lower the yieldability of the described closing member and hence the sharper the variation of the speed of the electric motor 1 and the associated high-speed shaft 5 of the reducer 2, the faster the present device switches out the electric motor 1 to stop the drive. Therefore, the present device switches out the electric motor with a required advance and prevents the device from dynamic overloads, the time of advance being automatically set depending on the rate of increase of the overload imposed upon the closing member drive.

What is claimed is:

1. A safety device for the drive of a closing member, comprising a switch for the drive and a mechanical overload sensor made in the form of a nut located on a shaft of the drive, said nut being spring-loaded at both end faces thereof; displacement of said sensor along the shaft causing said sensor to interact with the switch arranged to cut said drive out should an overload thereof arise, characterized in that said nut comprising a flywheel having an inertial mass sufficient for providing axial displacement thereof under variations in speed of said shaft, said nut being coupled to said shaft by means of a non-braking thread.

2. A safety device as claimed in claim 1, said closing member including a reduction gear; a high-speed rotatable gear shaft operatively engaged with said reduction gear, said shaft having a threaded portion of the quick-pitch thread type, said flywheel being mounted on said threaded shaft portion; and return spring means imparting an axial force to said flywheel so as to cause said flywheel to run reversely toward an initial position in the absence of an overload acting on said drive.

* * * * *